United States Patent [19]
Bergstedt et al.

[11] Patent Number: 5,742,160
[45] Date of Patent: Apr. 21, 1998

[54] APPARATUS FOR DETERMINING ANGULAR POSITION AND ROTATIONAL SPEED USING A ROTATING MAGNET AND A DIRECTIONAL MAGNETOMETER

[75] Inventors: Roderick G. Bergstedt, Fort Wayne; Donald J. Schreiber, Columbia City; Thomas G. Klapheke, Fort Wayne; Russell C. Smith, Albion, all of Ind.

[73] Assignee: Hughes Electronics, Los Angeles, Calif.

[21] Appl. No.: 727,942

[22] Filed: Oct. 9, 1996

Related U.S. Application Data

[62] Division of Ser. No. 546,343, Oct. 20, 1995, Pat. No. 5,602,472, which is a continuation of Ser. No. 242,156, May 13, 1994, abandoned, which is a continuation-in-part of Ser. No. 5,318, Jan. 15, 1993, abandoned.

[51] Int. Cl.⁶ .............. G01B 7/30; G01P 3/487; G01P 15/00; B60T 8/32
[52] U.S. Cl. .............. 324/207.25; 324/162; 324/174; 324/207.16
[58] Field of Search .............. 324/162, 163, 324/165, 166, 173, 174, 207.16–207.2, 207.25, 253, 254; 340/671; 310/156, 168; 188/181 R, 181 A

[56] References Cited

U.S. PATENT DOCUMENTS

| | | | |
|---|---|---|---|
| 2,536,805 | 1/1951 | Hansen, Jr. | 324/207.2 X |
| 3,575,616 | 4/1971 | Jordan | 324/207.25 X |
| 3,805,161 | 4/1974 | Bayha et al. | 324/174 X |
| 4,481,469 | 11/1984 | Hauler et al. | 324/174 |
| 4,562,399 | 12/1985 | Fisher | 324/174 X |
| 4,646,011 | 2/1987 | Wallrafen | 324/254 X |
| 4,739,263 | 4/1988 | Mohri et al. | 324/253 X |
| 5,252,919 | 10/1993 | Uemura | 324/253 X |

*Primary Examiner*—Gerard R. Strecker
*Attorney, Agent, or Firm*—Gordon R. Lindeen, III; Michael W. Sales; Wanda K. Denson-Low

[57] ABSTRACT

In a preferred embodiment, an apparatus for detecting the angular position, rotational speed, and/or acceleration of a rotatable member, including: an annular magnetic source circumferentially disposed on the rotatable member and rotatable therewith; a directional magnetometer having a toroidal core, disposed at a location in proximity to the magnetic source, with the rotatable member passing through the toroidal core, the directional magnetometer being oriented so as to detect the amplitude and/or change of amplitude of only a tangential magnetic flux field component of the magnetic source, and to provide outputs indicative thereof; and apparatus to receive the outputs and to determine therefrom the angular position, rotational speed, and/or acceleration of the rotatable member.

15 Claims, 9 Drawing Sheets

APPARATUS FOR DETERMINING ANGULAR POSITION AND ROTATIONAL SPEED USING A ROTATING MAGNET AND A DIRECTIONAL MAGNETOMETER

CROSS-REFERENCE TO RELATED APPLICATIONS

The present application is a division of U.S. application Ser. No. 08/546,343, filed Oct. 20, 1995, now U.S. Pat. No. 5,602,472, issued Feb. 11, 1997, which is a continuation of U.S. application Ser. No. 08/242,156, filed May 13, 1994, now abandoned, which is a continuation-in-part of U.S. application Ser. No. 08/005,318, filed Jan. 15, 1993, now abandoned.

BACKGROUND OF THE INVENTION

1. Field of the Invention

The present invention relates to position sensing generally and, more particularly, but not by way of limitation, to a novel device and method for measuring angular speed and position.

2. Background Art

There are a number of known devices for measuring angular position and/or speed of a rotating member. These are useful in many applications and, recently, have been employed in antiskid brake systems (ABS) and for vehicular traction control.

Most ABS in use today rely upon passive variable reluctance sensing elements disposed in proximity to a toothed iron wheel to detect the speed of rotation of a wheel or drive shaft. Such devices suffer from two primary disadvantages: (1) the output signal of the sensing device degrades unless a close tolerance is kept between the sensor and the toothed wheel (typically 0.015 inches), and (2) the amplitude of the output signal decreases as the rotational speed decreases. The former disadvantage results in high manufacturing cost and susceptibility to minor dislocations between the sensor and the toothed wheel, leading to reliability problems. The second disadvantage renders this type of device of limited utility at low speeds. A complicated arrangement of sensors and wheel teeth must be employed if absolute angular position information is to be derived therefrom.

The foregoing systems typically employ "off-axis" sensors, with the sensors being radially spaced apart from the rotating member.

Examples of alternative magnetic means of measuring shaft rotation are evident in the literature. Three which exemplify "on-axis" detection means are discussed below. By "on-axis" detection is meant those cases in which the directional magnetic sensor is located on the axis of rotation of the rotating member which frequently has a magnet attached to the distal end thereof, with the N-S poles radially oriented with respect to the shaft. Such sensors measure the direction of the magnetic field in the equatorial region of the magnetic source (comparable to the field found at the earth's equator.) As the dipolar magnetic source rotates, the field strength on the axis of rotation remains constant and only the direction changes.

Examples of on-axis sensors include the work of W. Wallrafen (U.S. Pat. No. 4,646,011, issued Feb. 24, 1987) who determined wind direction by placing a magnetic source on the end of a shaft which was axially rotated by the wind, causing the direction of the field to change at the on-axis location of a solid state compass. Similarly, M. E. Coburn (U.S. Pat. No. 4,647,853, issued Mar. 3, 1987) determined the rotational rate of a mud driven well drill bit by placing a dipolar magnetic source on the top of the rotating drill shaft and monitoring the output from a three axis magnetometer mounted on the axis of rotation of the drill bit, adjacent to the rotating magnet.

A third example of an on-axis sensor is the patent of S. Uemura (U.S. Pat. No. 5,252,919, issued Oct. 12, 1993) who determined shaft rotation over a limited arc using a magnetic source attached to the rotating shaft and two directional magnetic sensors disposed on the axis of rotation at predetermined angles.

Other rotation detection means which utilize magnetic fields include such devices as that of F. Kuhrt (U.S. Pat. No. 3,317,829, issued May 2, 1967) which utilizes the tone generated by the passage of permanent magnets, embedded in a rotating disk, past a magnetic sensor to determine rotational speed. Such a device is only capable of measuring rotational speed, however, not angular position, and is limited in accuracy by the number of permanent magnets embedded in the disk. Its operation is very similar to the prior art which utilizes a tone wheel and a variable reluctance sensor.

Accordingly, it is a principal object of the present invention to provide an angular speed and position measuring device which is economical to install and which does not require critical physical alignment.

It is another object of the invention to provide such a measuring device which can be calibrated after installation.

It is another object of the invention to provide such a measuring device which can accept minor dislocations in the field.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, an apparatus for detecting the angular position, rotational speed, and/or acceleration of a rotatable member, comprising: an annular magnetic source circumferentially disposed on said rotatable member and rotatable therewith; a directional magnetometer, having a toroidal core, disposed at a location in proximity to said magnetic source, with said rotatable member passing through said toroidal core, said directional magnetometer being oriented so as to detect the amplitude and/or change of amplitude of only a tangential magnetic flux field component of said magnetic source, and to provide outputs indicative thereof; and means to receive said outputs and to determine therefrom the angular position, rotational speed, and/or acceleration of said rotatable member.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Referring should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

Figures 1, 1A:
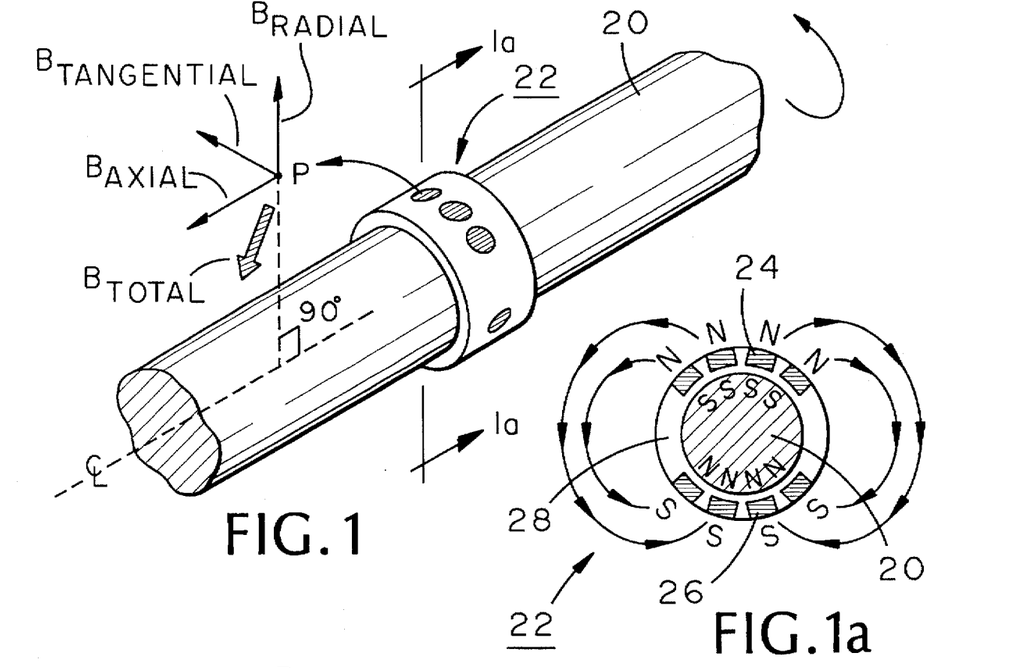
FIGS. 1, 1a, 2, and 2a schematically illustrate magnetic flux field components produced by an annular magnet which is disposed about, and rotates with, an axle or shaft.

FIG. 1 illustrates a rotatable, cylindrical shaft 20 on the surface of which is circumferentially attached thereto an annular magnet structure, generally indicated by the reference numeral 22. Magnet structure 22 comprises a plurality of radially magnetized, cylindrical magnets, such as 24 and 26, embedded in a suitable host material 28 mounted around shaft 20 to produce a magnetic field which emanates from a distributed N polar region of the magnet structure and terminates in a distributed S polar region thereof as is illustrated on FIG. 1a.

Magnet structure 22 produces a magnetic field in the region about shaft 20 which rotates with the rotation of the shaft and which may be visualized as shown. The total magnetic flux density at any point P in this region is given by the vector $B_{total}$ which is the vector sum of three orthogonal flux density component vectors $B_{axial}$, $B_{radial}$, and $B_{tangential}$, as indicated on FIG. 1, where the axial field is in the direction of the centerline of shaft 20, the radial component is radially outward from the centerline, and the tangential field is in the circumferential direction.

Figures 2, 2A:
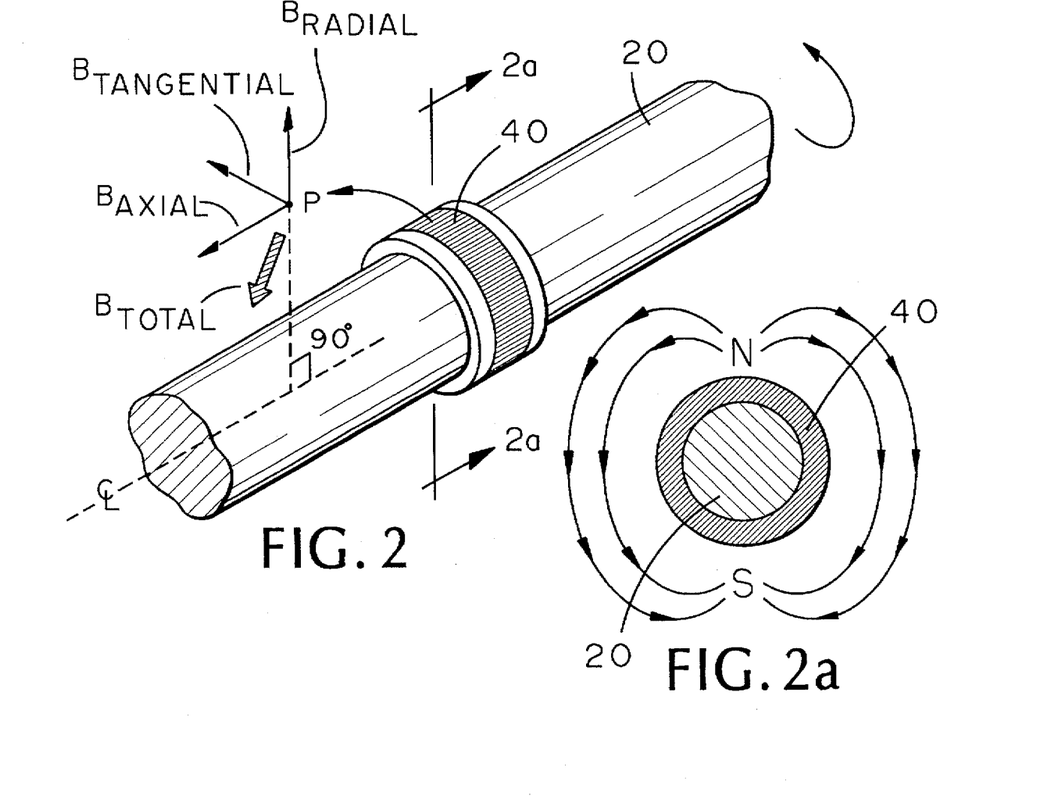

FIG. 2 illustrates shaft 20 having thereon a continuous annular magnetized solid ring 40 which produces a magnetic field somewhat similar to that produced by magnet structure 22 on FIG. 1 as is illustrated on FIG. 2a.

Figure 3:
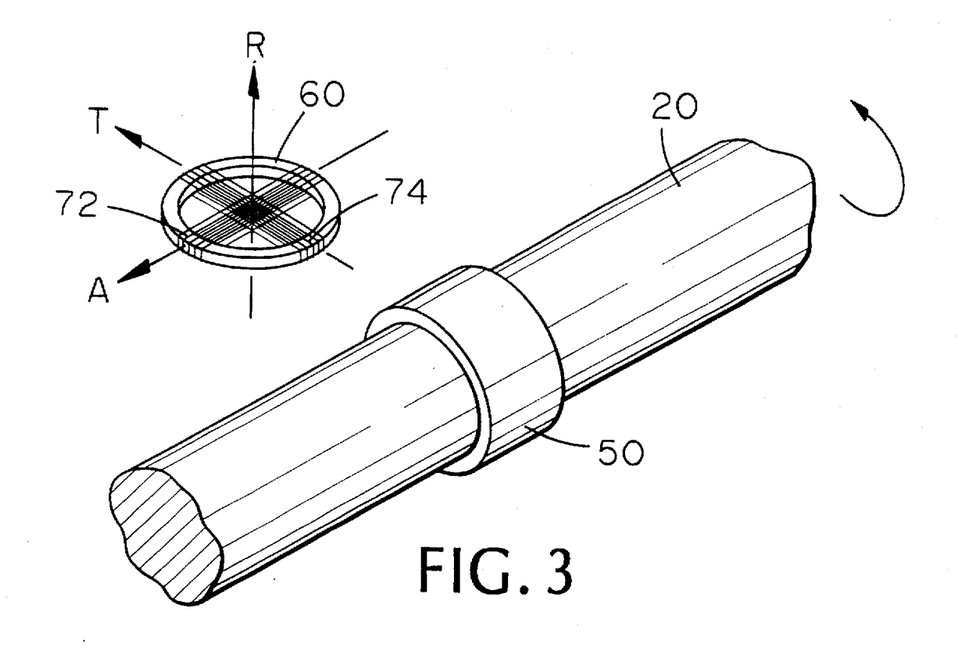
FIG. 3 schematically illustrates a directional sensor disposed in one position relative to a magnet of FIGS. 1 or 2.

FIG. 3 illustrates one possible arrangement for detecting the field strength of a magnetic source 50 disposed about shaft 20. Here, a directional magnetic sensor 60, such as a toroidal fluxgate magnetometer, element which detects the angular "direction" of a rotating magnetic field in the plane of operation of the sensor, is disposed in proximity to magnetic source 50.

A type of fluxgate magnetometer useful in the present invention, and the construction thereof and controls therefore, are discussed in "Technical Support Package for Tech Brief LAR-13560, 'Improved Flux-Gate Magnetometer,' by H. Douglas Garner, NASA Tech Briefs, P-27, October 1987, National Aeronautics and Space Administration, Technology Utilization Office, Langley Research Center, Hampton, Va., which document and the references cited therein are incorporated by reference hereinto.

As shown on FIG. 3, sensor 60 is oriented such that the sensitive plane of the sensor is orthogonal to the radial field component, and the sensor will monitor the tangential and axial field components through orthogonal secondary sensing windings 72 and 74, respectively. Sensor 60 will also be provided with a primary winding (not shown). As magnetic source 50 rotates, the axial field will be at a maximum when the N pole of the magnet is adjacent the sensor. In this position, the tangential field component is at a null. Rotating magnetic source 50 through 90 degrees places a maximum in the tangential field and a null in the axial field at sensor 60. These field components, therefore, form, roughly speaking, sine and cosine functions of the orientation of the shaft, which, through conventional processing techniques, can be used to determine shaft orientation and, from the time rate of change of orientation, the speed and acceleration of shaft 20.

Figure 4:
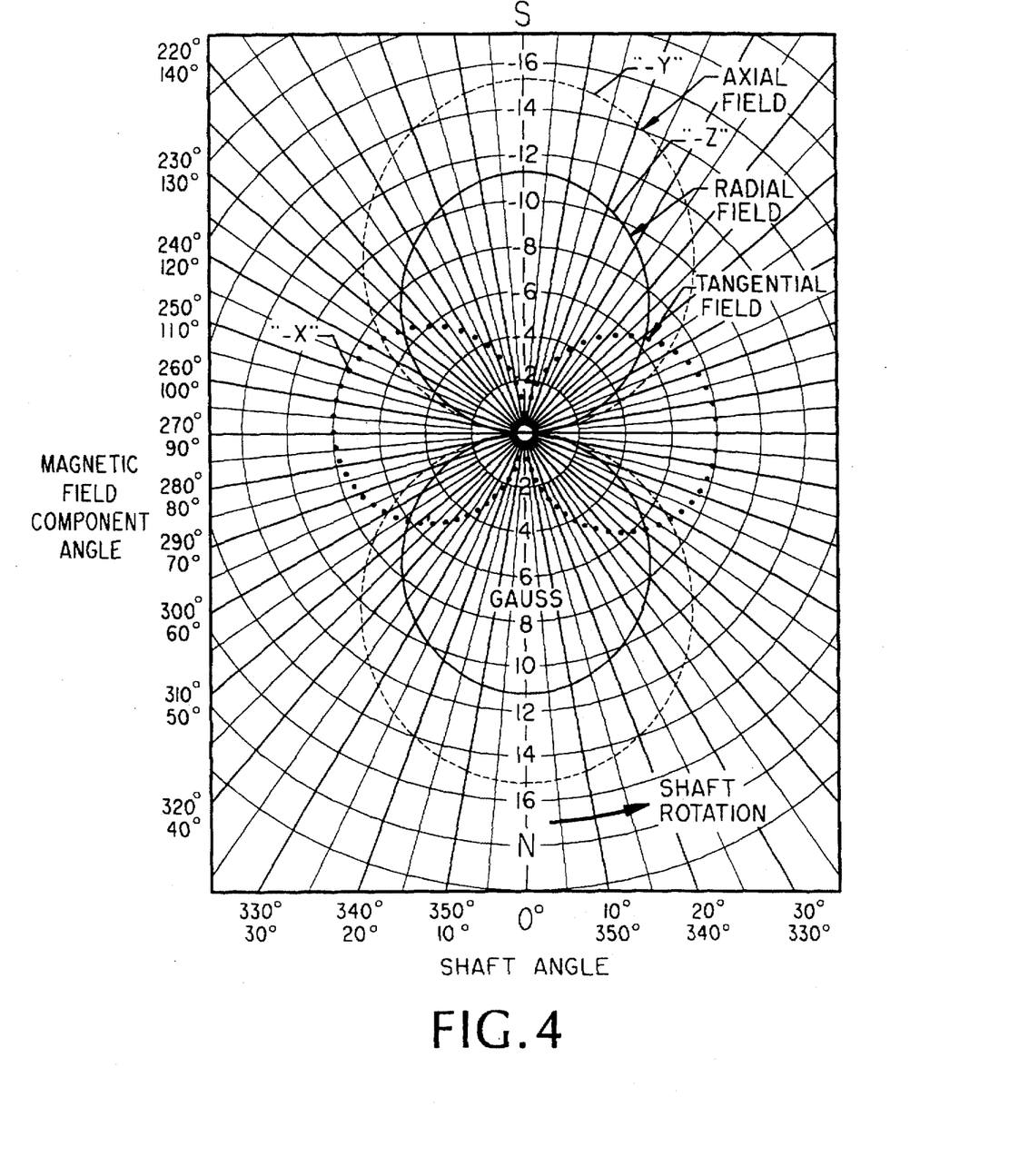
FIG. 4 is a typical polar diagram illustrating strengths of magnetic field components as functions of angle of rotation of a magnet of FIGS. 1 and 2 and the measured angle of the field components, as measured in an environment free of extraneous ferromagnetic materials.
Figure 5:
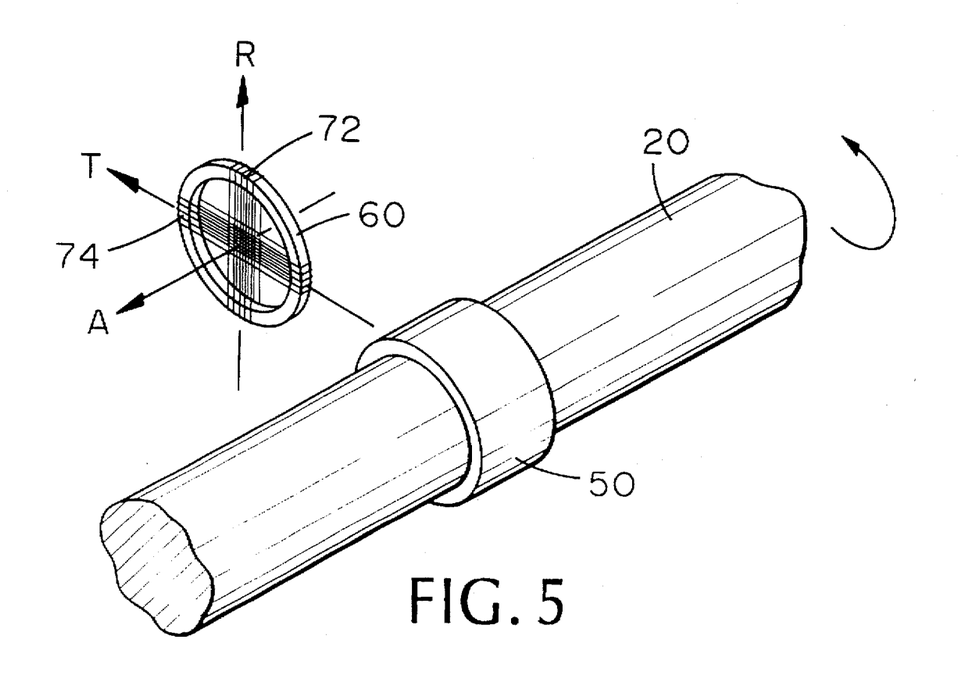
FIG. 5 schematically illustrates a directional sensor disposed in another position relative to a magnet of FIGS. 1 or 2.

FIG. 5 illustrates sensor 60 disposed such that the sensitive plane thereof is orthogonal to the axial field component so that sensing windings 72 and 74 detect the tangential and radial field components, respectively. In this configuration, when the N pole is adjacent sensor 60, the radial component is at a maximum and the tangential is at a null. Rotation through 90 degrees places a null in the radial component and a maximum in the tangential component. Note on FIG. 4, which shows typical field components measured in an off-axis location adjacent a rotating ring magnet, that while the magnetic field components are orthogonal (have zero crossings a 90 degree intervals), the components are not matched in amplitude. (This is also characteristic of the field from an ideal dipole.) Therefore, the orthogonal secondary windings of the sensor of FIG. 3 will have unequal peak amplitudes. This is relatable to the fact that the total field, in the plane of the sensor, rotates in an elliptic path with major and minor axes in the axial and tangential directions, respectively. Without suitable adjustment, a fluxgate sensor will not accurately show the rotation of the shaft degree by degree, but will show cyclic error (second harmonic) appearing at the points 45 degrees from the zero crossings. Suitable amplitude adjustment can be made by several means. One can adjust the relative gain in the secondary channels, or one can change the ratio of turns of the two secondaries, so as to give equal outputs at the four points which are 45 degrees from the zero crossings. Alternatively, one might rotate the sensor about an axis in the tangent direction utilizing the sensor's directionality to attenuate the amplitude of the larger axial field in the plane of the sensor. Of these approaches, the latter is preferred, since it matches the amplitude of the orthogonal field components in the plane of the sensor, and, therefore, the accuracy of the bearing results is independent of the orientation of the sensor about its axis of symmetry. This latter approach is discussed in more detail below. These field components may, therefore, be used to determine shaft rotation and position in the same manner that the axial and tangential field components were employed above with reference to FIG. 3. The same type of amplitude adjustment will be required when using the tangential and radial fields (FIG. 5) as was necessary when operating as was shown previously utilizing the tangential and axial fields as shown on FIG. 3. Amplitudes of the secondary windings' outputs must be matched to account for the unequal radial and tangential field amplitudes. This can be accomplished using the techniques of gain adjustment or orientation of the sensor's plane of operation as discussed above.

Although the use of solid ring magnet 40 on FIG. 2 is satisfactory, the use of distributed magnet sources shown on FIG. 1 is preferable in that that arrangement is less expensive to fabricate and it offers flexibility in that it permits arranging the positions of the distributed sources to shape the magnetic field in a desired manner for enhanced sensing thereof. Even though the FIG. 1 arrangement produces a magnetic field with distributed sources, the magnetic field is acceptably uniform at the points of sensing shown on FIGS. 3 and 5.

The relationship between shaft position and magnetic field component direction is shown on FIG. 4. Inspection of FIGS. 3 and 5 and reference to FIG. 4 indicates that the axial and radial field components contain similar information and, therefore, either of them, or any combination of them, may be used, together with the tangential field component to measure shaft orientation. This implies that the plane of operation of sensor 60 (FIGS. 3 and 5) may be angularly located anywhere within a 90-degree sector, between the positions shown on FIGS. 3 and 5, as long as the sensor is rotated about an axis in the direction of the tangential field. This allows considerable freedom in orientation of the plane of operation of sensor 60 and allows one to mount the sensor in various orientations to ease installation or optimize performance. It is assumed, of course, that one then adjusts the outputs of the orthogonal secondaries to obtain equal output amplitudes at 45 degree orientations from the fields' null directions.

A sensor located in the plane of an annular magnetic source will detect no axial field, since there is none, and must be oriented with its axis directed parallel to that of the rotating source in order to detect the radial and tangential fields.

As the sensor is moved axially away from the annular magnetic source, the axial field increases and the sensor may be rotated about the direction of the tangential field component to detect a combination of the axial and radial field components together with the tangential field component to determine shaft orientation. While the plane of operation of the sensor is not critical, in general the normal to the plane of operation should be rotated from the direction of the axial component toward the direction of the radial component as the sensor is moved axially away from the magnet source.

When a ring magnet is placed on a rotating ferromagnetic shaft, such as is commonly the case when using steel, and the configuration is then housed in a steel housing, considerable distortion of the magnetic field at a point, which was essentially the tangential field in the case of a non-ferrous environment, becomes less predictable and must be determined either analytically or experimentally. In general, the tangential field no longer has nulls at the same angles of rotation at which the radial and axial fields reach a maximum. The orientation of the plane of the sensor will have to be adjusted so that the zero crossings of the fields within the plane of the sensor are once again at 90 degrees with respect to each other. Then, the amplitudes must be equalized either by further orientation of the sensor by rotation about the minor field direction, or by gain adjustment as outlined previously. In general, the rotational measurement errors can be minimized through sensor orientation to obtain zero crossings located at 90 degree intervals, and then further adjusted to attain amplitude match of the orthogonal components. Even after these adjustments are made, however, residual errors, will remain which are second or higher harmonics of the rotation of the shaft. These errors are primarily due to the peculiarities of the magnetic environment. They are, however, repeatable from rotation to rotation and may, therefore, be corrected for after generating a calibration curve, or through generation and application of an electronic look-up table. As long as the sensor output is a monotonic, single valued function of the rotation angle of the axle, it can be corrected through calibration. The proper orientation of the plane of operation of the sensor is different for different magnetic structures and varies as one changes the sensor/magnetic source geometry and surroundings. Sensor placement with respect to the magnetic source is not critical and good performance can be obtained in an axle housing environment, for example, with axial separation between the sensor and the source of between 0.5 and 2 inches. Radial placement is also not critical, but should be consistent to within about 0.25 inch.

Whenever, in the appended claims, specific field orientations are identified, it will be understood that these orientations are those as may be displaced as above, and the same nomenclature will apply, even though the orientations are not specifically as shown on FIGS. 1 and 2.

Figure 6:
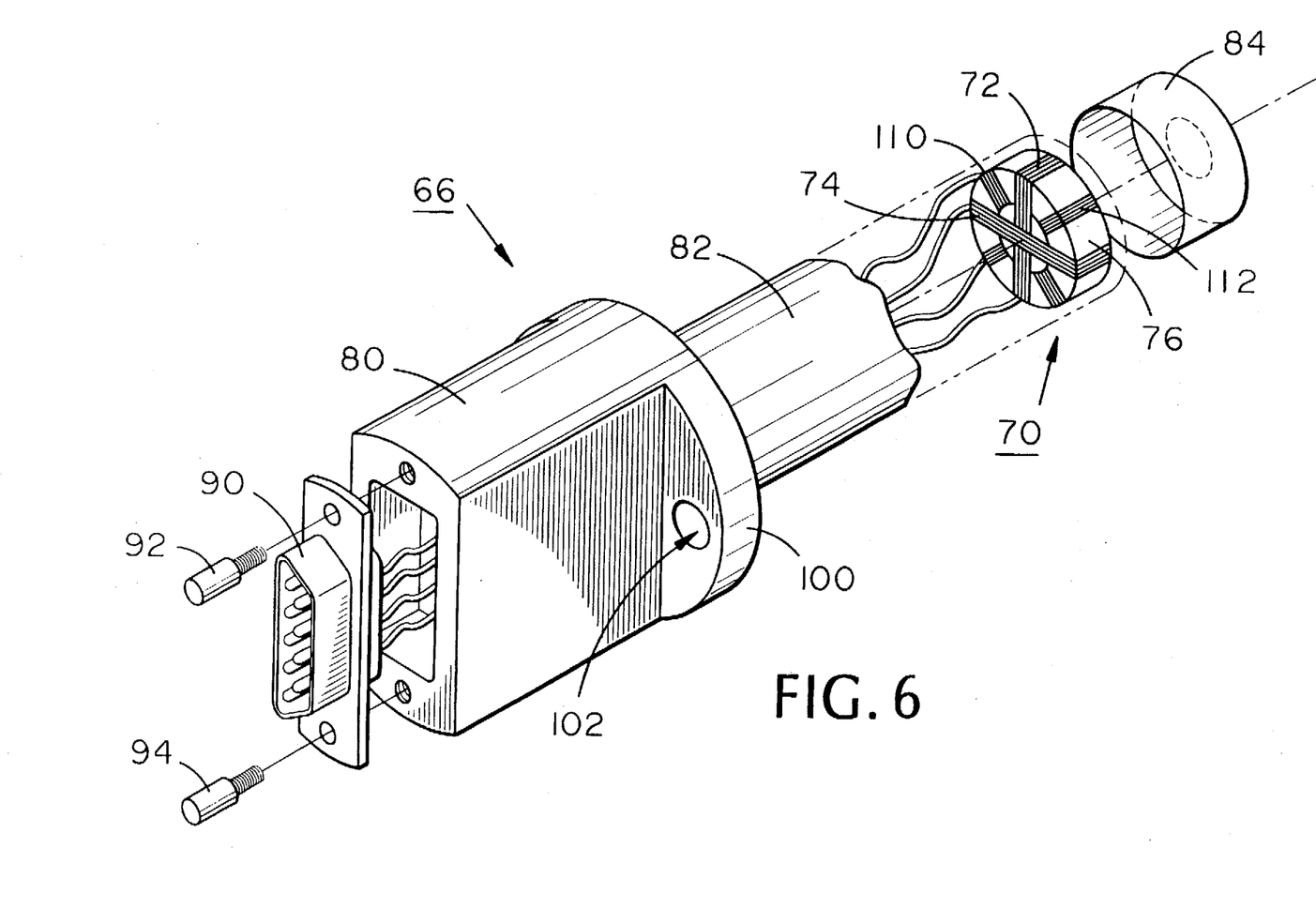
FIG. 6 is an exploded perspective view of a magnetic angular position sensor unit constructed according to the present invention.

FIG. 6 illustrates a sensor unit, generally indicated by the reference numeral 66, including a sensor, generally indicated by the reference numeral 70, mounted therein. Sensor 70 is basically a conventional fluxgate magnetometer arranged with orthogonal sets of secondary windings 72 and 74 to serve as the sensing elements. Windings 72 and 74 are wound to span the entire diameter of a high-permeability, toroidal core 76 for ease of fabrication. Core 76 has a primary winding wound thereabout, shown wound in quadrature sections 110 and 112, 45 degrees from the secondary windings 72 and 74. Primary winding sections 110 and 112 are wound unidirectionally to induce an AC magnetic field in core 76. The arrangement of secondary windings 72 and 74 is equivalent to diametrically opposed windings in a toroidal transformer wired so as to cancel the voltage output ordinarily seen.

If the magnetic flux induced by primary winding sections 110 and 112 (driven at about 1 KHz) were homogeneous throughout core 76, then the voltages generated in diametrically opposed secondary windings of 72 and 74 would be equal and, when summed in opposition, would give no output. In the presence of an external DC magnetic field, however, the external flux will enter core 76 and divide between the two sides thereof. This flux will, at any instant of time, add to the driving flux in one arm and subtract from it in the other. The net result is a non-homogeneous flux distribution in the arms of core 76 orthogonal to the direction of the external field. One of secondary windings 72 or 74 wound on the arms orthogonal to the direction of the external field will, therefore, produce an output voltage, while the orthogonal set will produce none. Therefore, sine and cosine directional channels are produced and the direction of the magnetic field can be inferred from the outputs of the two sets of secondary windings. Conventional processing of these signals will produce information as to angular position, speed, and/or acceleration.

Sensor unit 66 includes a housing 80 having a hollow cylindrical portion 82 extending from the distal end thereof in which cylindrical portion sensor 70 is mounted. A high-permeability, cylindrical magnetic shield 84 may be fitted over sensor 70 to make the sensed magnetic field more uniform in the internal region containing the sensor. Shield 84 can also be used to control the field strength for operation near the magnetizing ring (50, FIGS. 3 and 5). The thickness of shield 84, the material thereof, and the shape thereof must be selected to optimize sensor performance in the magnetic environment of the particular application. Shield 84 may take a variety of shapes, from a simple ring to the fully closed cap surrounding and enclosing sensor 70 shown on FIG. 6.

Figure 7:
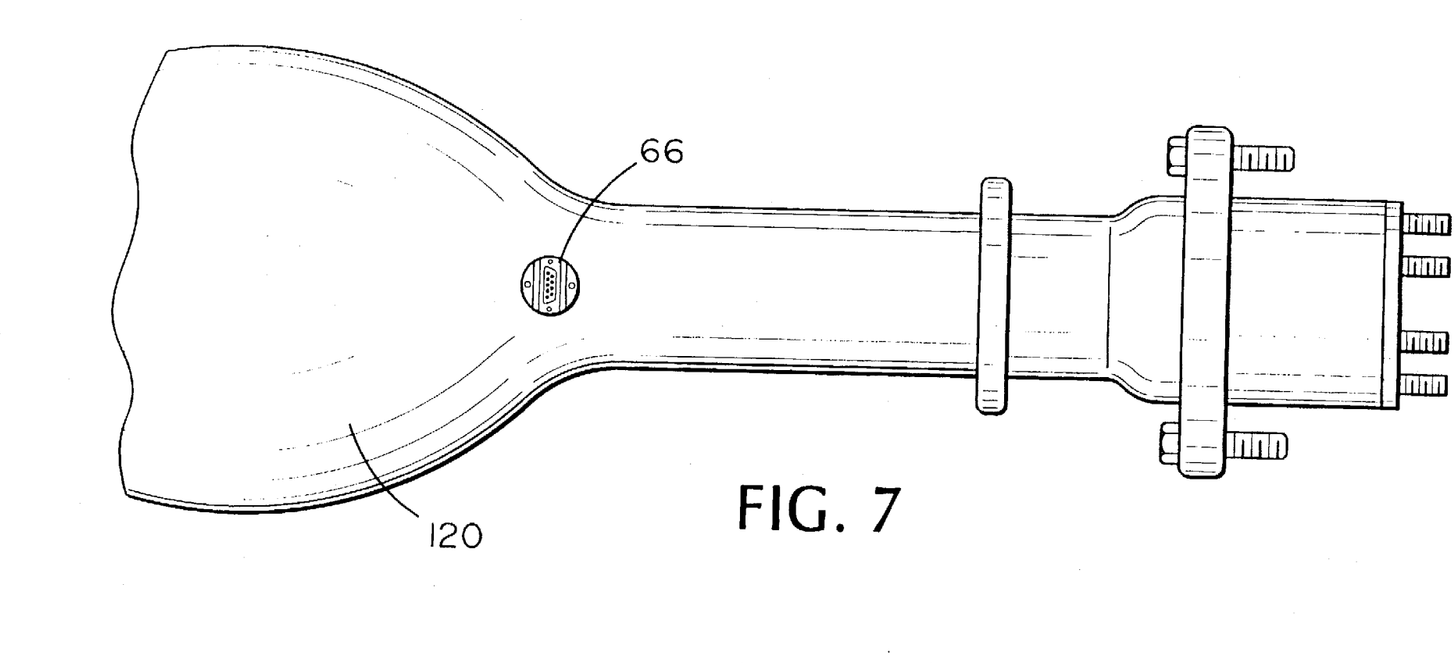
FIG. 7 is a fragmentary, side elevational view, of the sensor unit of FIG. 6 mounted in an axle housing.

At the proximal end of housing 80 is a connector 90 mounted thereto by means of screws 92 and 94. Housing 80 has formed thereabout a mounting flange 100 having holes, as at 102, defined therethrough such that sensor unit 66 may be bolted to an axle housing 120, as shown on FIG. 7, for example.

Alignment of orthogonal secondary windings 72 and 74 (FIG. 6) about the axis of symmetry of sensor 70 is not critical if the orthogonal field components sensed by the sensor are well matched, having suitably disposed nulls. Sensor 70 must be aligned so that one senses independent orthogonal field components. In the latter configuration, the outputs of the orthogonal windings may be independently and differently amplified in the electronics (not shown) so as to give more nearly equal amplitudes as the sensed member rotates.

Figure 8:
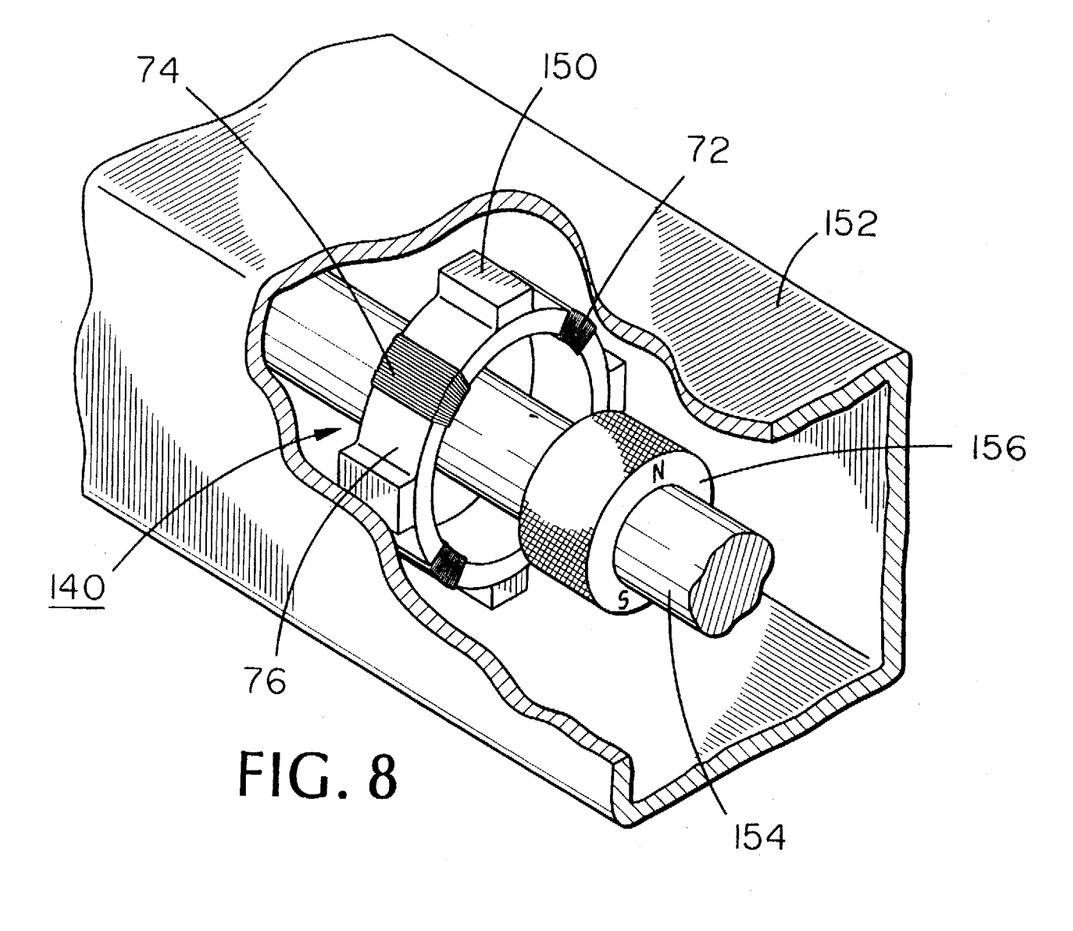
FIG. 8 is a fragmentary, perspective view, partially cutaway, of an alternative embodiment of a magnetic angular position sensor unit constructed according to the present invention.

FIG. 8 illustrates a toroidal ring sensor, generally indicated by the reference numeral 140, of the type described above, mounted in a housing 152 by means of a plurality of mounting flanges, as at 150, and coaxially surrounding a rotating axle 154. In this case, secondary windings 72 and 74 are not wound completely around toroidal ring 76, since axle 154 passes through the center of the ring. (Primary windings are not shown.) Each sensor channel is now composed of diametrically opposed windings on toroidal ring 76, which are wound in electrical opposition to cancel the combined output when no external magnetic field is present. Toroidal ring 140 is shown as being axially displaced from a ring magnet 156 mounted on axle 154, but the sensor could also be mounted superjacent the ring magnet. The arrangement shown is preferable, since the diameter of the sensor can be smaller and installation thereof easier and less expensive. In either case, the non-rotating sensor detects the rotational angle of axle 154 by detecting the rotation of only the tangential component of the magnetic field produced by ring magnet 156.

Figure 9:
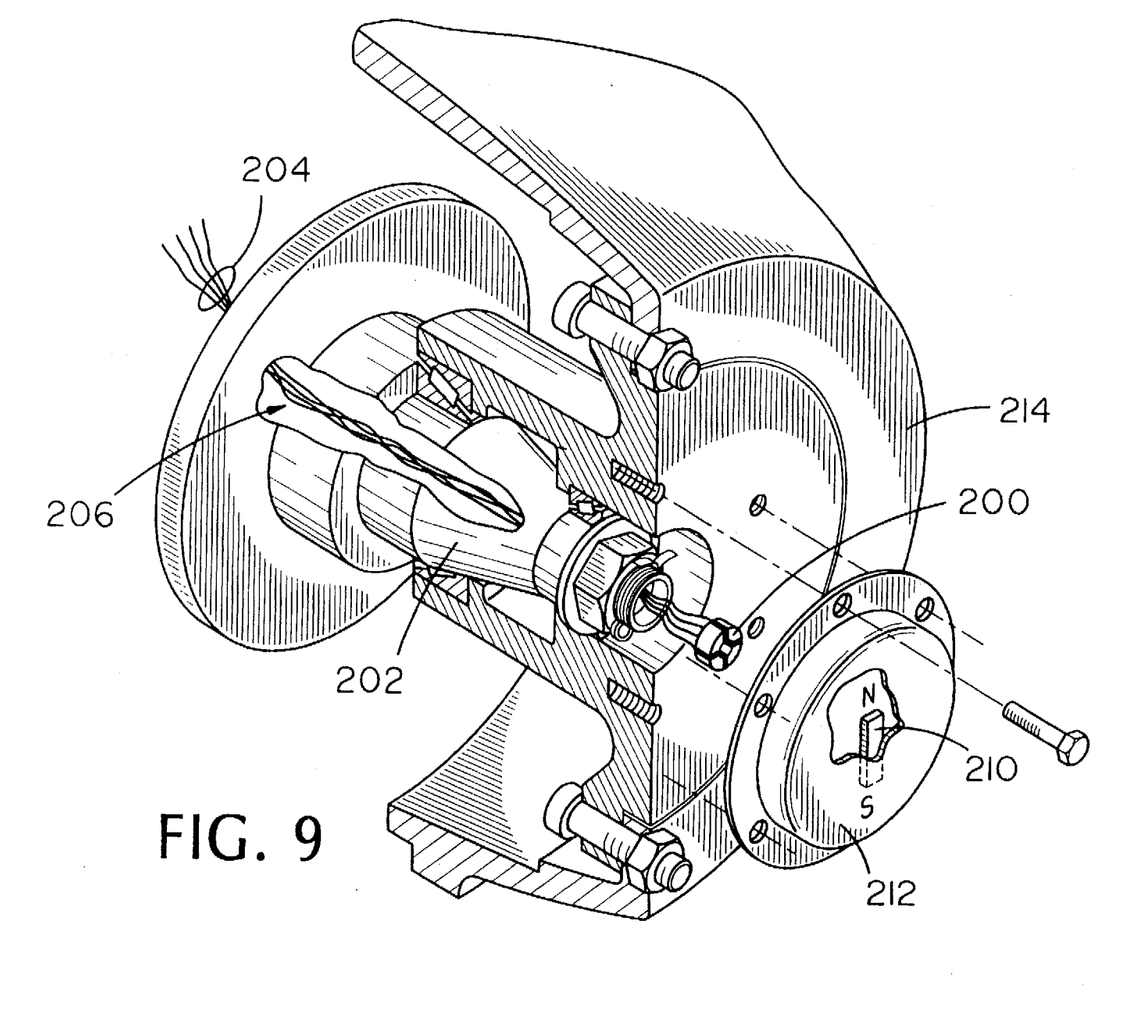
FIG. 9 is a fragmentary, perspective view, partially in cross-section of another alternative embodiment of a magnetic angular position sensor unit constructed according to the present invention.

FIG. 9 illustrates an embodiment of the present invention which is useful where wheel rotation on a non-rotating spindle or axle must be determined, such as in the case of non-driven vehicle wheels. Here, a sensor 200, is mounted at the distal end of a fixed spindle 202, with leads 204 from the sensor disposed in a channel 206 defined through the spindle. A magnetic source 210, which may be a ring or, as shown, a dipole bar magnet, is fixedly attached to a grease cap, or hub, 212 which, in turn, is fixedly mounted to a drum 214 which rotates coaxially about spindle 202. Sensor 200, in this case is on the axis of rotation and, senses the rotation of the magnetic field in the magnetic dipole's equatorial plane and detects the axle's angular orientation from the field orientation thereof.

Figure 10:
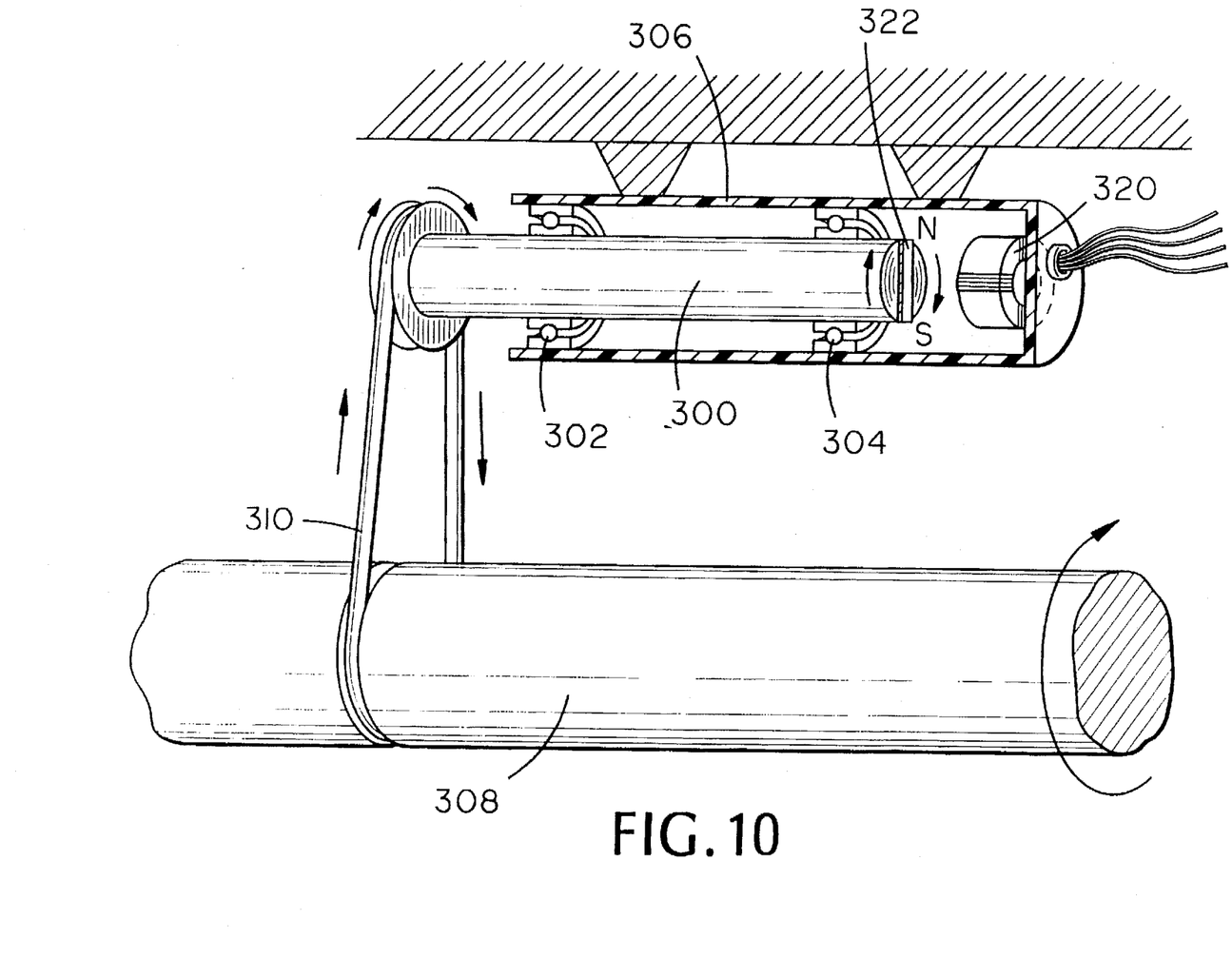
FIG. 10 is a fragmentary, perspective view, partially in cross-section of a further alternative embodiment of a magnetic angular position sensor unit constructed according to the present invention.

In some cases, it may be undesirable to mount a ring magnet on a shaft or it may be that the sensing of shaft rotation is to be done remote from the shaft. FIG. 10 illustrates an embodiment of the present invention suitable for use in such cases. Here, a secondary shaft 300 is journalled in bearings 302 and 304 in a fixed mount 306. Secondary shaft 300 rotates about an axis parallel to the axis of rotation of a primary shaft 308, the rotation of the latter being of interest, and is driven by the primary shaft by means of a continuous belt 310, or other drive means may be provided. A fluxgate sensor 320 is fixedly attached to mount 306 in proximity to a dipole magnet 322 mounted at the end of secondary shaft 300. Operation of the arrangement is identical to that described above with reference to FIG. 9. Rotation of primary shaft 308 is easily determined from the sensed rotation of secondary shaft 300. Other means of determining the orientation of secondary shaft 300 are also possible, such as the means described above with reference to FIGS. 3 and 5.

Figure 11:
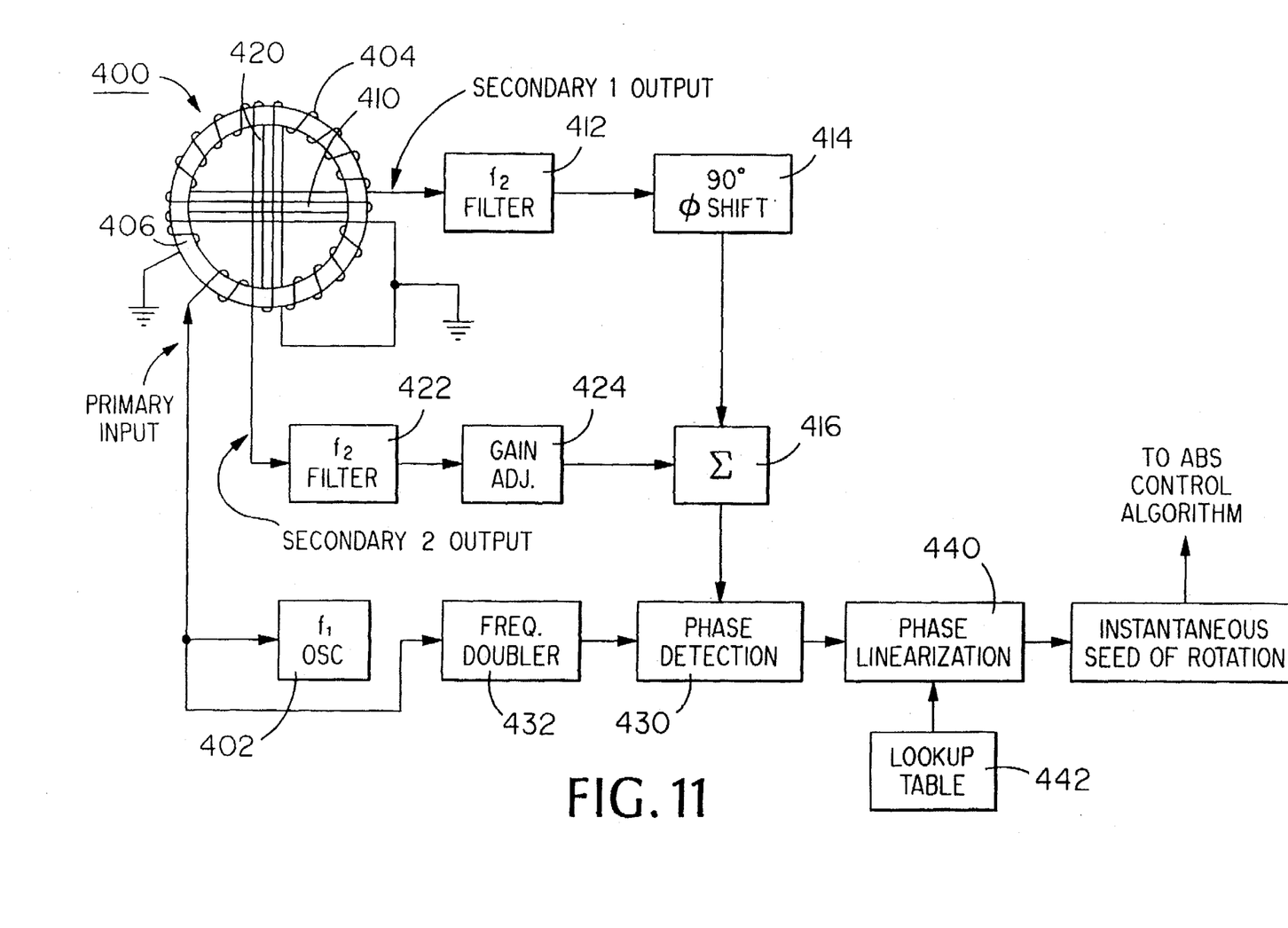
FIG. 11 is a block/schematic diagram showing conventional means for processing the secondary outputs from a magnetometer.

FIG. 11 illustrates conventional means to process the secondary outputs from a magnetometer, generally indicated by the reference numeral 400, of the type described above. Here, an oscillator 402 provides alternating current at a selected frequency to a primary winding 404 on a toroidal core 406. An output from a first secondary winding 410 on toroidal core 406 passes through a first secondary filter 412 and a 90-degree phase shifter 414 to a summer 416. An output from a second secondary winding 420 passes through a second secondary filter 422 and a gain adjuster 424 to summer 416. The output of summer 416 is input to a phase detector 430 which also receives as an input the doubled primary frequency through a frequency doubler 432. The output of phase detector 430 is input to a phase linearizer 440 which communicates with a lookup table 442 and provides an output of instantaneous speed of rotation which may be used as an input to an antiskid brake system control algorithm. Similar processing circuitry may be employed to derive position and/or acceleration. For example, phase difference between the secondary outputs can be used to determine position: rate of change of speed can be used to determine rate of acceleration.

All patent applications, patents, and other documents cited herein are incorporated in their entirety by reference hereinto.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

We claim:

1. An apparatus for detecting the angular position of a rotatable member, comprising:
   (a) an annular magnetic source circumferentially disposed on said rotatable member and rotatable therewith, said annular magnetic source generating a tangential magnetic flux field component;
   (b) a directional fluxgate magnetometer, having a toroidal core, disposed at a location in proximity to said magnetic source, with said rotatable member passing through said toroidal core, said directional magnetometer being oriented so as to detect the amplitude and/or change of amplitude of only said tangential magnetic flux field component of said magnetic source, and to provide outputs indicative thereof; and (c) means to receive said outputs and to determine therefrom the angular position of said rotatable member.

2. An apparatus, as defined in claim 1, wherein: said toroidal core is displaced axially from said magnetic source along said rotatable member.

3. An apparatus, as defined in claim 1, wherein: said toroidal core and said magnetic source lie in a common plane.

4. An apparatus, as defined in claim 1, wherein: said apparatus includes sensor channels, each of said sensor channels comprising two, diametrically opposed windings wound on said toroidal core.

5. An apparatus, as defined in claim 4, wherein: said apparatus includes two said sensor channels, said two said sensor channels being wound in electrical opposition to cancel outputs thereof when no external magnetic field is present.

6. An apparatus for detecting the rotational speed of a rotatable member, comprising:

(a) an annular magnetic source circumferentially disposed on said rotatable member and rotatable therewith, said annular magnetic source generating a tangential magnetic flux field component;

(b) a directional fluxgate magnetometer, having a toroidal core, disposed at a location in proximity to said magnetic source, with said rotatable member passing through said toroidal core, said directional magnetometer being oriented so as to detect the amplitude and/or change of amplitude of only said tangential magnetic flux field component of said magnetic source, and to provide outputs indicative thereof; and (c) means to receive said outputs and to determine therefrom the rotational speed of said rotatable member.

7. An apparatus, as defined in claim 6, wherein: said toroidal core is displaced axially from said magnetic source along said rotatable member.

8. An apparatus, as defined in claim 6, wherein: said toroidal core and said magnetic source lie in a common plane.

9. An apparatus, as defined in claim 6, wherein: said apparatus includes sensor channels, each of said sensor channels comprising two, diametrically opposed windings wound on said toroidal core.

10. An apparatus, as defined in claim 9, wherein: said apparatus includes two said sensor channels, said two said sensor channels being wound in electrical opposition to cancel outputs thereof when no external magnetic field is present.

11. An apparatus for detecting the acceleration of a rotatable member, comprising:

(a) an annular magnetic source circumferentially disposed on said rotatable member and rotatable therewith, said annular magnetic source generating a tangential magnetic flux field component;

(b) a directional fluxgate magnetometer, having a toroidal core, disposed at a location in proximity to said magnetic source, with said rotatable member passing through said toroidal core, said directional magnetometer being oriented so as to detect the amplitude and/or change of amplitude of only said tangential magnetic flux field component of said magnetic source, and to provide outputs indicative thereof; and (c) means to receive said outputs and to determine therefrom acceleration of said rotatable member.

12. An apparatus, as defined in claim 11, wherein: said toroidal core is displaced axially from said magnetic source along said rotatable member.

13. An apparatus, as defined in claim 11, wherein: said toroidal core and said magnetic source lie in a common plane.

14. An apparatus, as defined in claim 11, wherein: said apparatus includes sensor channels, each of said sensor channels comprising two, diametrically opposed windings wound on said toroidal core.

15. An apparatus, as defined in claim 14, wherein: said apparatus includes two said sensor channels, said two said sensor channels being wound in electrical opposition to cancel outputs thereof when no external magnetic field is present.

* * * * *

UNITED STATES PATENT AND TRADEMARK OFFICE
CERTIFICATE OF CORRECTION

PATENT NO : 5,742,160
DATED : April 21, 1998
INVENTOR(S) : Roderick G. Bergstedt, et al.

It is certified that error appears in the above-identified patent and that said Letters Patent is hereby corrected as shown below:

On the Title Page, column 1, line [76], after "Donald J.", please delete "Schreiber" and insert therefor --Scheiber--.

In the Drawings, Sheet 9, Figure 11, after "instantaneous", please delete "seed" and insert therefor, --speed--.

Signed and Sealed this

Thirtieth Day of March, 1999

Attest:

Attesting Officer

Q. TODD DICKINSON

Acting Commissioner of Patents and Trademarks